UNITED STATES PATENT OFFICE.

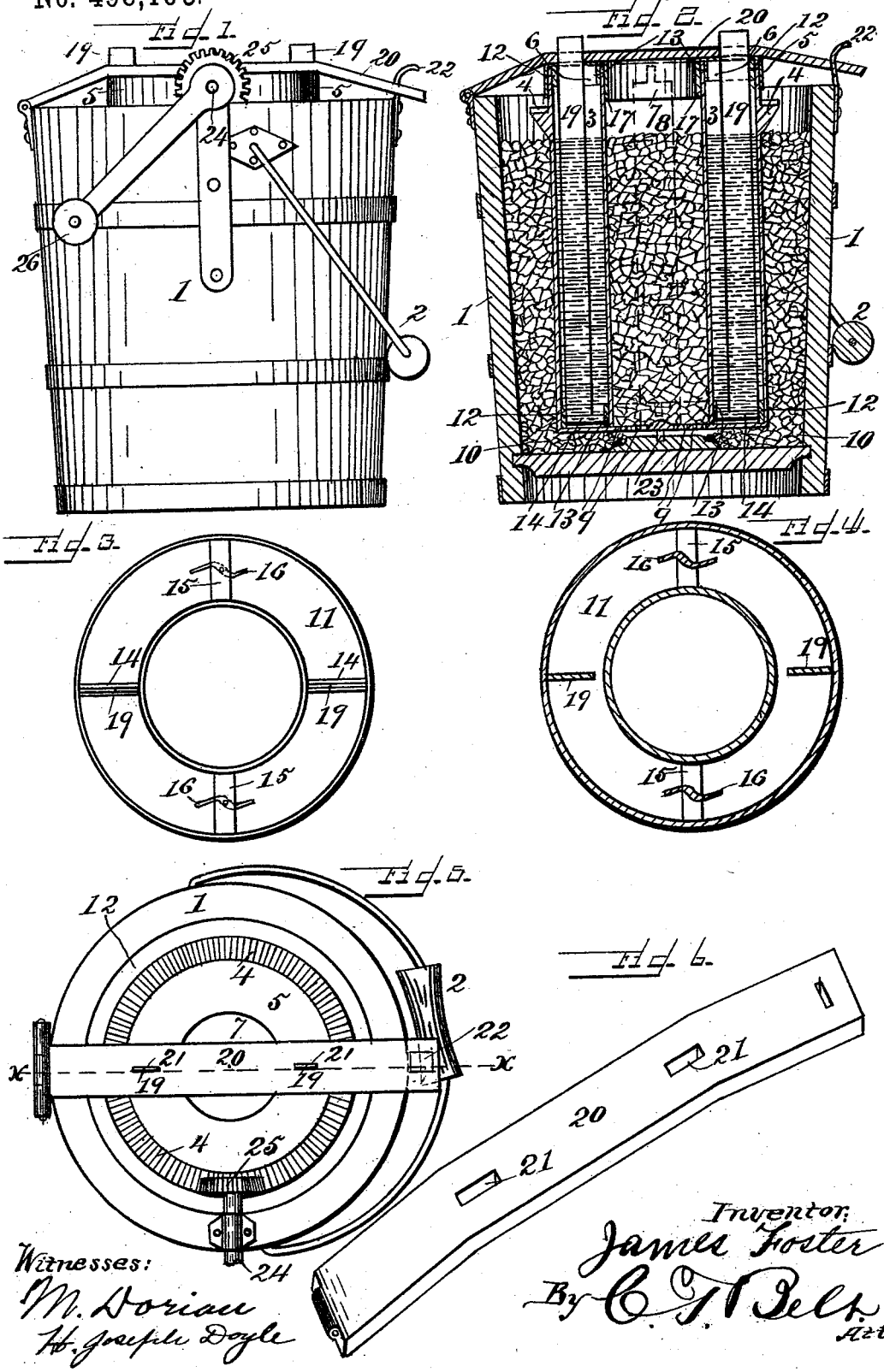

JAMES FOSTER, OF STARKVILLE, MISSISSIPPI.

ICE-CREAM FREEZER.

SPECIFICATION forming part of Letters Patent No. 498,163, dated May 23, 1893.

Application filed January 26, 1893. Serial No. 459,881. (No model.)

*To all whom it may concern:*

Be it known that I, JAMES FOSTER, a citizen of the United States, residing at Starkville, in the county of Oktibbeha and State of Mississippi, have invented certain new and useful Improvements in Ice-Cream Freezers, of which the following is a specification.

This invention relates to ice cream freezers, and its novelty will be fully understood from the following description and claims when taken in connection with the accompanying drawings; and the object of the invention is to provide an ice cream freezer with a central receptacle or ice well and an outer ice receptacle having a cream receptacle between them.

A further object of the invention is to provide a stationary dasher frame of novel construction to fit in the said cream chamber or receptacle, and means for rigidly holding it there while the ice receptacle is revolved.

In the accompanying drawings forming part of this specification: Figure 1 is an elevation of the freezer. Fig. 2 is a section thereof taken on the plane indicated by the dotted line $x$—$x$ in Fig. 5. Fig. 3 is an enlarged bottom end view of the dasher frame and dashers. Fig. 4 is a cross section thereof. Fig. 5 is a top plan view of the freezer. Fig. 6 is a perspective view of the locking bar.

The same reference numerals denote the same parts throughout the several figures of the drawings.

The barrel or tub 1 is of usual construction, having a handle 2, and is made large enough to receive the annular cream receptacle 3, which is provided upon its periphery near the top with a circular toothed flange 4, and a cover or cap 5, having slots 6, a central opening 7, and an inwardly projecting flange 17. The receptacle 3 has a central ice tube or well 8 formed integral with the bottom thereof, having an open top, and a bottom provided with perforations 9, which opens communication between the ice space 10, and the central ice chamber or well 8.

The dasher frame 11 is located in the cream chamber 3 and consists of two outer rings or circular pieces 12, one located at either end of the frame so as to fit the interior of the cream chamber 3, and within each of said rings 12 is secured a smaller ring 13 which fits around the exterior of the ice well 8, the rings being joined together by means of arms 14, at the bottom end of the frame 11, and journal arms 15 at both ends of the frame. In these arms 15 are journaled the pivots of the movable dashers 16, which are S shaped in cross section, and are free to be turned by the pressure of the cream in the chamber. At the bottom of the dasher frame, also joining the rings, are the other arms 14, to which are secured the fixed, (with the said frame) or rigid dasher 19, which extend upward between and above the two top rings, and through the slots 6 in the cover or cap 5, where they are engaged by the locking plate 20, having slots 21, it being hinged at one end to one side of the tub, and the other end adapted to engage a spring catch 22, upon the opposite side of the tub.

By this construction and arrangement the dasher frame is locked fast in the cream chamber so that it cannot turn with it; which turning is effected by the pivot 23 of the cream receptacle resting in a journal bearing in the bottom of the tub; the shaft 24 journaled upon the rim of the tub, and provided with a gear wheel or pinion 25, which engages the toothed flange 4; and an operating handle 26

It will be observed that in operating the freezer, the cream receptacle, only, is moved or revolved while the dasher frame is left rigid with the tub, so that the dashers as well as the frame will agitate the cream.

Although I have shown and described four dashers, with as many rings, I do not wish to be understood as limiting myself to any particular number of said parts or to the character of the material of which they are constructed.

Having described my invention, what I claim as new, and desire to secure by Letters Patent, is—

1. In an ice cream freezer, the dashers and the dasher frame having its ends formed by two rings one within the other, the two outer rings being rigidly connected together by means of two of the dashers, substantially as set forth.

2. The combination with an ice cream freezer, the rings forming the top and bottom of the dasher frame, the dashers rigid with the rings, the movable dashers, and the arms 15 connecting the rings and in which the said movable dashers are pivoted, substantially as set forth.

3. In an ice cream freezer, the dasher frame, the journal arms 15, the movable dashers pivoted at their ends in the said arms, the cream receptacle having a central ice well, and means such as shown and described for holding the dasher frame fixed in the said receptacle, as set forth.

4. In an ice cream freezer, the dasher frame, the movable S shaped dashers pivoted at their ends in the journal arms of the frame, the cream receptacle, the ice well formed in the receptacle and means such as shown and described for holding the said frame fixed in the said receptacle, for the purpose set forth.

5. The combination with an ice cream freezer, the cream receptacle, having the circular tooth flange, the central ice well formed integral with the bottom of said receptacle and having itself a perforated bottom, the dasher frame secured in the cream receptacle, and the cap or cover 5 having slots 6, through which two of the dashers of the said frame project, substantially as and for the purpose set forth.

6. The tub 1, the locking bar hinged to the tub and provided with slots, in combination with the cream receptacle, the central ice well having a perforated bottom and an open top, the cap or cover 5 having slots, the dasher frame having rigid and movable dashers, the said rigid dashers projecting through the cover, and means such as shown and described for revolving the said receptacle, as set forth.

7. The tub 1, the journal bearing formed in the center of the bottom of the tub, the locking bar hinged to the tub, and the shaft journaled upon the rim of said tub having one end provided with a pinion and upon the other end an operating handle, in combination with the cream receptacle provided with a toothed flange engaged by the said pinion, and having a central pivot in its bottom to rest in the said bearing of the tub, the ice well, formed in the center of the cream receptacle the dashers, and the dasher frame two of said dashers projecting through the locking bar so as to hold the dasher frame rigid with the tub while the cream receptacle is revolved, substantially as shown and described.

In witness whereof I hereunto set my hand in the presence of two witnesses.

JAMES FOSTER.

Witnesses:
S. B. CHAMBERS,
J. L. MARTIN.